United States Patent [19]
Schnell

[11] 3,932,007
[45] Jan. 13, 1976

[54] SLIDING-JOINT ASSEMBLY FOR TEST FRAME OR THE LIKE

[75] Inventor: Burkhard Schnell, Ulm, Danube, Germany

[73] Assignee: Zwick & Co. Kommanditgesellschaft, Einsingen, Germany

[22] Filed: Aug. 1, 1973

[21] Appl. No.: 384,573

[30] Foreign Application Priority Data
Aug. 11, 1972  Germany............................ 2239555

[52] U.S. Cl................. 308/238; 308/237; 308/4 R; 279/48; 403/374
[51] Int. Cl.² ..................... F16C 27/00; F16C 33/00
[58] Field of Search ........... 403/290, 371, 373, 374; 279/48; 308/4 R, 3.5, 237, 238

[56] References Cited
UNITED STATES PATENTS

| 108,679 | 10/1870 | Boyden | 403/290 |
| 1,258,580 | 3/1918 | Lassiter | 403/374 |
| 3,782,842 | 1/1974 | Benker | 403/374 |

FOREIGN PATENTS OR APPLICATIONS

| 464,969 | 4/1937 | United Kingdom | 403/290 |
| 430,249 | 9/1948 | Italy | 279/48 |
| 23,046 | 2/1949 | Finland | 279/48 |

Primary Examiner—Charles J. Myhre
Assistant Examiner—R. H. Lazarus
Attorney, Agent, or Firm—Karl F. Ross; Herbert Dubno

[57] ABSTRACT

A machine element slidable on a tie rod is formed with a throughgoing counterbored hole through which the tie rod passes. A cylindrical bushing has at one end a flange secured to the shoulder in the hole and another end formed with a plurality of longitudinally open slots that subdivide this other end into a plurality of fingers. A first abutment ring is received in the one end of the bushing and has an inner periphery spaced from the tie rod and a second such abutment or slide ring is held by the fingers closely against the tie rod. A clamp is provided around the other end to hold the second ring tightly against the tie rod. There is a radial clearance between the clamp and the counterbore which is greater than the radial clearance between the first sliding ring and the tie rod.

7 Claims, 4 Drawing Figures

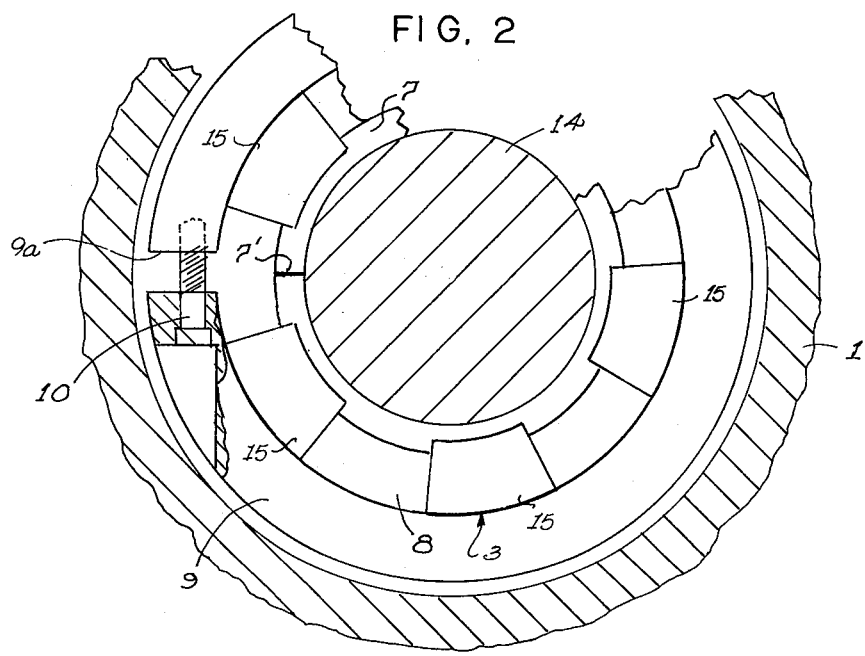
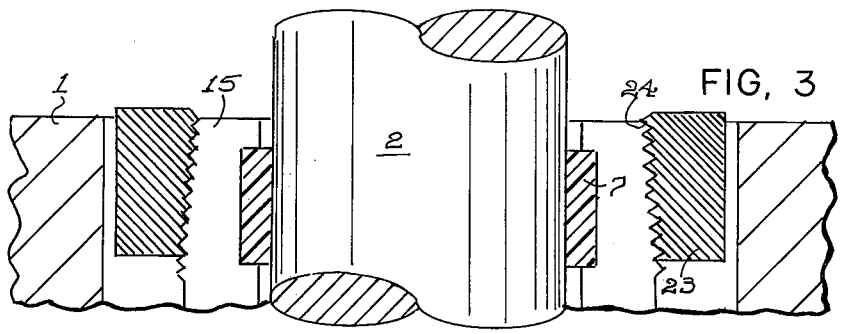
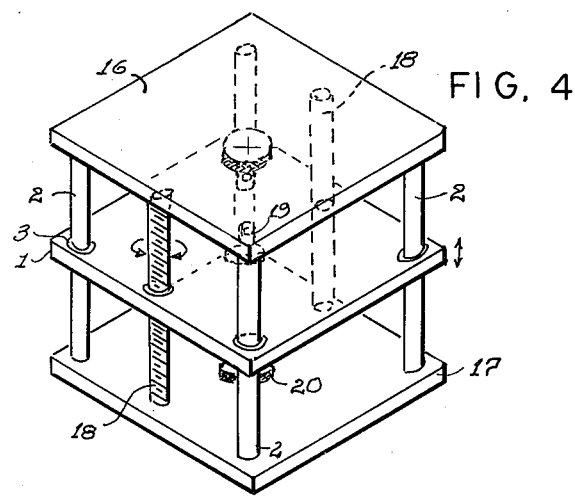

SLIDING-JOINT ASSEMBLY FOR TEST FRAME OR THE LIKE

FIELD OF THE INVENTION

The present invention relates to a sliding-joint assembly for guiding a traverse or the like on a tie rod. More specifically this invention concerns such a joint for a test frame.

BACKGROUND OF THE INVENTION

In a conventional test frame the intermediate plate or traverse is formed in its corners with finely machined cylindrical bores receiving the tie rods that extend between a pair of end plates. The intermediate plate can be displaced along the tie rods by threaded spindles to position a workpiece or specimen which is placed under stress either by the spindles or by another device.

It is necessary in such devices, and indeed in all such arrangements as extrusion presses and the like wherein a plate or the like slides along a plurality of tie rods, that the tie rods be perfectly parallel. If they are not, the sliding element will bind and not ride easily since either it will have to deform or have to bend the tie rods slightly. In addition any heating or cooling of the sliding element often will misalign the bores and the tie rods to create such a binding, so that these devices must often be readjusted.

OBJECTS OF THE INVENTION

It is therefore an object of the present invention to provide an improved sliding-joint assembly for a test frame, extrusion press, or the like.

Another object is the provision of such an assembly which overcomes the above-given disadvantages.

SUMMARY OF THE INVENTION

These objects are attained according to this invention by providing on the element being guided at each tie rod a cylindrical elongated bushing having one end secured to the element and another end formed with a plurality of longitudinal slots that form a plurality of longitudinally extending fingers. A guide ring is compressed between these two fingers and the tie rod by a radially effective clamp such as a split ring provided with a tightening screw or by a tightening cone. The rings are made of a material with a low coefficient of friction rods as polytetrafluoroethylene or a polyamide.

Such an assembly compensates for any minor misalignment of the tie rods relative to each other or relative to the bores in the plate. The fingers can move laterally relative to the central axis of the unstressed bushing to hold the tie rod even when the bushing and tie rod are not perfectly aligned so as to give surface contact at all times, not just line contact as in prior-art devices.

In accordance with another feature of this invention the bushing is received in the element in a counterbored hole having two cylindrical sections seperated by a shoulder. The bushing has at one end a flange screwed to the shoulder and at the other end there is provided between the bushing or clamp a radial clearance. A ring is provided in one end of the bushing which spacedly surrounds the tie rod and the radial clearance between this spaced ring and the tie rod is smaller than the radial clearance between the other end or its clamp and the counterbore in the element.

DESCRIPTION OF THE DRAWING

The above and other objects, features, and advantages will become more apparent from the following description, reference being made to the accompanying drawing, in which:

FIG. 2 is a top view, partly broken away, of the assembly of FIG. 1;

FIG. 3 is a view similar to FIG. 1 illustrating an alternative embodiment of this invention; and FIG. 4 is a side-elevational view of a test frame incorporating the joint of FIG. 1.

SPECIFIC DESCRIPTION

Figure 1:
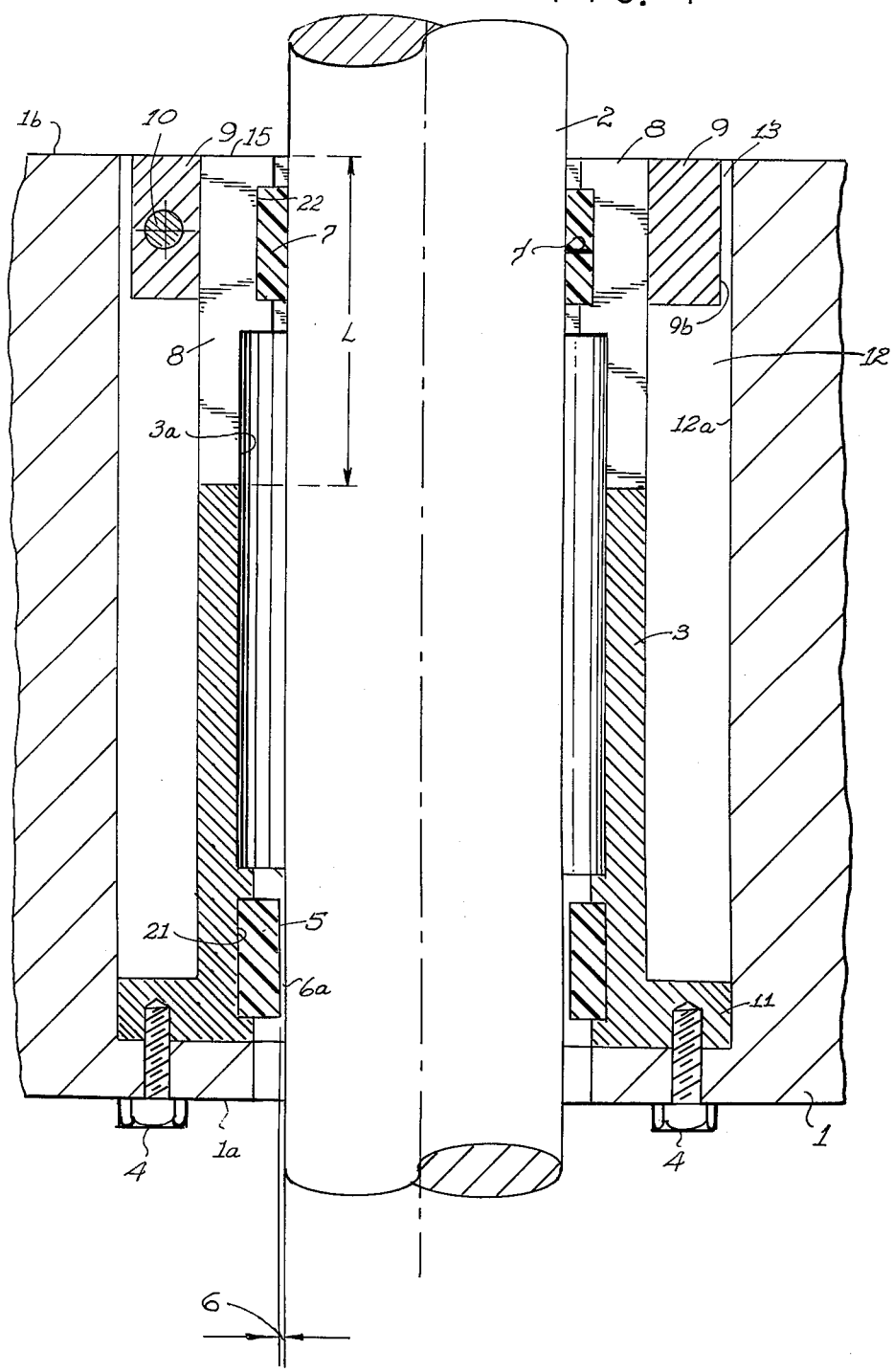
FIG. 1 is a longitudinal section through a sliding joint assembly according to the present invention.

As shown in FIG. 4 a test frame has a pair of vertically spaced rectangular end plates 16 and 17 between which extend four tie rods 2. In addition a pair of threaded drive spindles 18 extend between these plates and are rotatable by a motor (not shown) in the base. An intermediate plate 1 rides on the rods 2 between the plates 16 and 17 and is provided with a pair of sample holders 19 which can be secured to a sample to be compressed or tensioned, the other side of the sample being secured in a holder 20 on either the upper plate 16 or lower plate 17. Rotation of the spindles 18 displaces the intermediate element 1 along the rods 2. The spindles 18 are tensioned and the rods 2 compressed as discussed in the copending and commonly assigned patent application Ser. No. 384,574 filed Aug. 1, 1973 by Dietmar Spiess et al, now abandoned. The plates 1, 16, and 17 are formed as described in the copending and commonly assigned patent application Ser. No. 383,536 filed July 30, 1973 by Manfred Dripke now U.S. Pat. No. 3,859,848.

The rods 2 as shown in FIGS. 1 and 2 are received in each corner of the plate 1 in a steel bushing shown generally at 3. This bushing 3 is tubularly cylindrical and is formed at one end with a flange 11 which is secured by screws 4 to the shoulder 1a of a counterbored hole 12 passing axially through the plate 1. Adjacent this flange 11 the bushing 3 is formed with an inwardly open groove 21 in which a cylindrical ring 5 of polytetrafluoroethylene or polyamide is received. This ring 5 defines a cylindrically annular clearance 6a around the shaft 12 having a radial dimension shown at 6. At its other end the bushing 3 is formed with six splits 8 defining six angularly spaced and longitudinally extending fingers 15 having a length L equal to approximately a third of the overall axial length of the bushing 3 and ending generally flush with the face 1b of the element 1. These fingers 15 together form another groove 22 in which another Teflon or Nylon cylindrical ring 7 is received, this ring snugly surrounding the shaft 2. The bushing 3 and rings 5 and 7 are all coaxial about the axis 14 of the rod 2. The inner face of the bushing 3 is recessed at 3a between the rings 5 and 7.

Surrounding the free ends of fingers 15 is a split ring 9 whose split 9a is spanned by a screw 10 which, when tightened, urges the fingers 15 radially inwardly thereby pressing the ring 7 against the rod 2. There is defined between the outer periphery 9b of this ring 9 and the inside 12a of the bore 12 a uniform clearance 13 which is greater than the clearance 6.

FIG. 3 shows how in place of the ring 9, an unsplit internally conically threaded tightening ring 23 can be screwed down over similar conical threads 24 formed on the fingers 15. Rotation of this element can force the fingers 15 together to tighten the ring 7 on the shaft 2. This ring 7 can be formed advantageously with a helical split 7' so as to permit its tightening of this ring 7 on the rod 2.

In use, any deflection of the rods 2 or other misalignment transverse to their axes 14 can be compensated by elastic deformation of the bushing 3 radially through a distance equal to or smaller than the radial spacing 13. The elasticity of the fingers 15 is determined by their angular length, radial thickness, axial length, and the type of steel.

I claim:

1. A guide assembly comprising:
   a machine element adapted to be displaced;
   a rod extending through said element and slidably guiding same;
   a tubular and elongated bushing spacedly surrounding said rod and formed adjacent one end with at least one longitudinally extending open slot;
   means for securing the other end of said bushing to said element;
   a first guide ring carried in said bushing at said other end and having an inner periphery spaced from said rod by a predetermined distance;
   a second guide ring carried in said bushing at said one end and having an inner periphery snugly surrounding said rod; and
   means for urging said one end inwardly toward said rod thereby pressing said second ring against said rod.

2. The assembly defined in claim 1 wherein said bushing is formed with a plurality of such longitudinally extending open slots defining a plurality of longitudinally extending fingers, said means for urging engaging said fingers.

3. The assembly defined in claim 1 wherein said means for urging includes a split ring and a screw spanning the split in said split ring.

4. The assembly defined in claim 1 wherein said bushing is formed at said other end with an outwardly extending flange, said element being formed with a counterbored throughgoing hole receiving said bushing and having a shoulder, said flange being secured by said means for securing to said shoulder.

5. The assembly defined in claim 4 wherein said means for securing is at least one bolt engaged in said element.

6. The assembly defined in claim 4 wherein said one end of said bushing is generally on a level with the mouth of said counterbored hole.

7. The assembly defined in claim 4 wherein said means for urging said one end inwardly has an outer periphery spaced from the inside of said hole by a predetermined distance greater than the predetermined distance between said first guide ring and said tie rod.

* * * * *